United States Patent [19]

Ennis

[11] Patent Number: 5,208,870

[45] Date of Patent: May 4, 1993

[54] IMAGE INSPECTION METHODS AND APPARATUS

[75] Inventor: Daniel Ennis, Midlothian, Va.

[73] Assignee: Philip Morris Incorporated, New York, N.Y.

[21] Appl. No.: 718,781

[22] Filed: Jun. 21, 1991

[51] Int. Cl.$^5$ .............................................. G06K 9/00
[52] U.S. Cl. .......................................... 382/30; 382/1; 382/8; 382/27
[58] Field of Search ......................... 382/8, 30, 17–27; 358/105, 107, 101

[56] References Cited

U.S. PATENT DOCUMENTS

| | | | |
|---|---|---|---|
| 4,053,056 | 10/1977 | Day | 209/73 |
| 4,912,554 | 3/1990 | Neri | 358/106 |
| 4,965,840 | 10/1990 | Subbarao | 382/1 |
| 4,972,494 | 11/1990 | White et al. | 382/8 |
| 5,046,111 | 9/1991 | Cox et al. | 382/15 |

FOREIGN PATENT DOCUMENTS 330495 8/1989 European Pat. Off. .

Primary Examiner—Michael T. Razavi
Assistant Examiner—Yon Jung
Attorney, Agent, or Firm—Robert R. Jackson; Robert W. Morris

[57] ABSTRACT

An image is tested to determine whether it is substantially like a plurality of sample images by computing statistical information about the sample images and using that statistical information to analyze the image being tested. The analysis is such that the statistical parameters are standardized so that available tables of the central chi-square distribution function can be used, thereby simplifying the necessary calculations. If desired, images which have been determined by the method of this invention to be good can be used to refine the statistical information used in analyzing subsequent images. When an image is identified as unacceptable by the method of the invention, the data for that image can be decomposed in order to identify the parts of the image which are causing the image to be unacceptable.

14 Claims, 4 Drawing Sheets

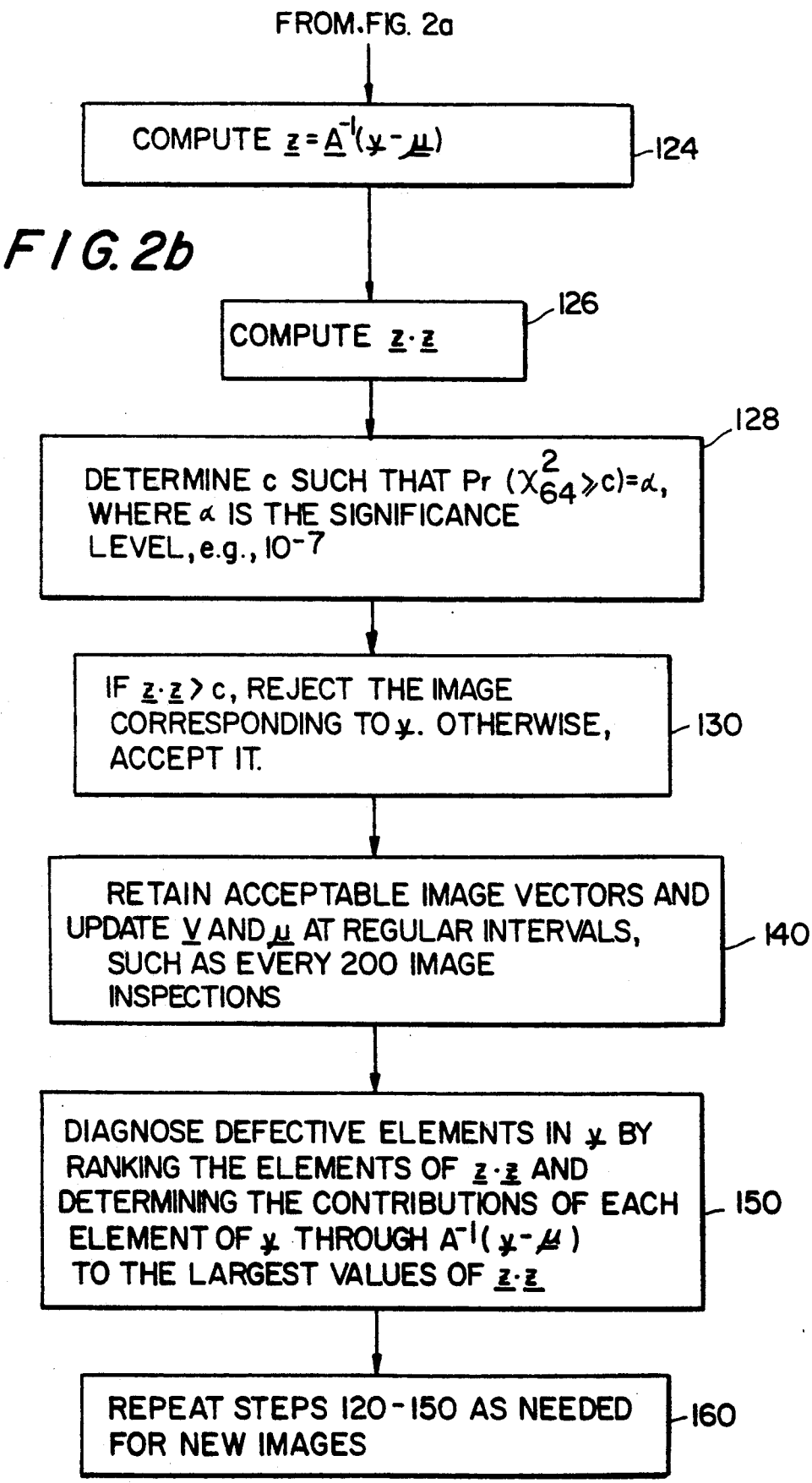

$$\underline{V} = \begin{vmatrix} \sigma_1^2 & \rho_{12}\sigma_1\sigma_2 \\ \rho_{12}\sigma_1\sigma_2 & \sigma_2^2 \end{vmatrix}$$

FIG. 3

$$\begin{vmatrix} a_{11} & 0 \\ a_{12} & a_{22} \end{vmatrix}$$

FIG. 4

$$\begin{vmatrix} a_{11} & a_{12} \\ 0 & a_{22} \end{vmatrix}$$

FIG. 5

$$\underline{z} = \underline{A}^{-1}(\underline{y} - \underline{\mu})$$

FIG. 6

IMAGE INSPECTION METHODS AND APPARATUS

BACKGROUND OF THE INVENTION

This invention relates to methods and apparatus for determining whether or not an image is substantially like other images.

Although the principles of this invention are equally applicable in other contexts, the invention will be fully understood from the following explanation of its use in the context of product image inspection.

Many products such as packaged foods and beverages, cleaning products, paper products, smoking articles, and the like are produced in such large quantities and at such high speeds that some form of automated image inspection is required if the appearance of the product is to be inspected. Such inspection is important because the product may not be saleable if its appearance is defective. In addition, the inspection system should promptly alert those in charge of production if an excessive number of defective-looking products are being produced. If possible, the inspection system should be able to advise those in charge of production where in the image the defect causing rejection is in order to assist in the formulation of corrective action.

Many prior art image inspection systems inspect only predetermined portions of an image. This has at least two important drawbacks. First, setting up such systems typically requires large amounts of highly skilled operator time, and this process may have to be repeated each time the product to be inspected changes. Second, the system may not detect defects of unexpected kinds or defects in unexpected places.

In view of the foregoing, it is an object of this invention to provide improved image inspection methods and apparatus.

It is a more particular object of this invention to provide image inspection methods and apparatus which can inspect all portions of an image if desired.

It is another more particular object of this invention to provide image inspection methods and apparatus which can set themselves up to perform image inspections by gathering data from samples of the images to be inspected.

SUMMARY OF THE INVENTION

These and other objects of the invention are accomplished in accordance with the principles of the invention by providing image inspection systems which perform a statistics-based analysis of the images to be inspected. This analysis employs normalized statistical functions so that regardless of the images being processed, the criterion used to determine whether an image is acceptable or not can simply be looked up in a standard table of statistical values.

The system first gathers statistical information from a plurality of sample images. In particular, the image information in each of a plurality of segments of each sample image is reduced to a single value so that each sample image can be represented as a vector of such values. A variance-covariance matrix of all of these vectors is then computed, as is a mean vector of these vectors. The Cholesky decomposition matrix of the variance-covariance matrix is then computed for use in normalizing the statistical analysis of the images to be inspected. The system is now ready for actual image inspection.

Each image to be inspected is initially processed in the same way that the processing of sample images begins, i.e., the image information in each segment is reduced to a single value so that the image can be represented by an image vector of these values. A product vector is then computed by multiplying the inverse of the Cholesky decomposition matrix by the difference between the image vector and the mean vector. The dot product of the product vector with itself is then computed to produce a single value which can be compared to a number taken from a standard statistical table based on the number of image segments employed in the image analysis and the desired probability of false rejection of an actually acceptable image. The relationship between the dot product and the number from the standard statistical table determines whether or not the image is acceptable.

If desired, data for images determined by the practice of the invention to be acceptable can be used to refine the statistical information used to process subsequent images. Also if desired, the computed values for unacceptable images can be decomposed to identify the image segments which are making the image unacceptable.

Further features of the invention, its nature and various advantages will be more apparent from the accompanying drawings and the following detailed description of the preferred embodiments.

BRIEF DESCRIPTION OF THE DRAWINGS

FIGS. 2a and 2b (referred to collectively as FIG. 2) are a flow chart of an illustrative embodiment of the image inspection methods of this invention.

FIGS. 3–5 show matrices useful in explaining techniques employed in the present invention.

FIG. 6 shows a mathematical relationship useful in explaining techniques employed in the present invention.

DETAILED DESCRIPTION OF THE PREFERRED EMBODIMENTS

Figure 1:
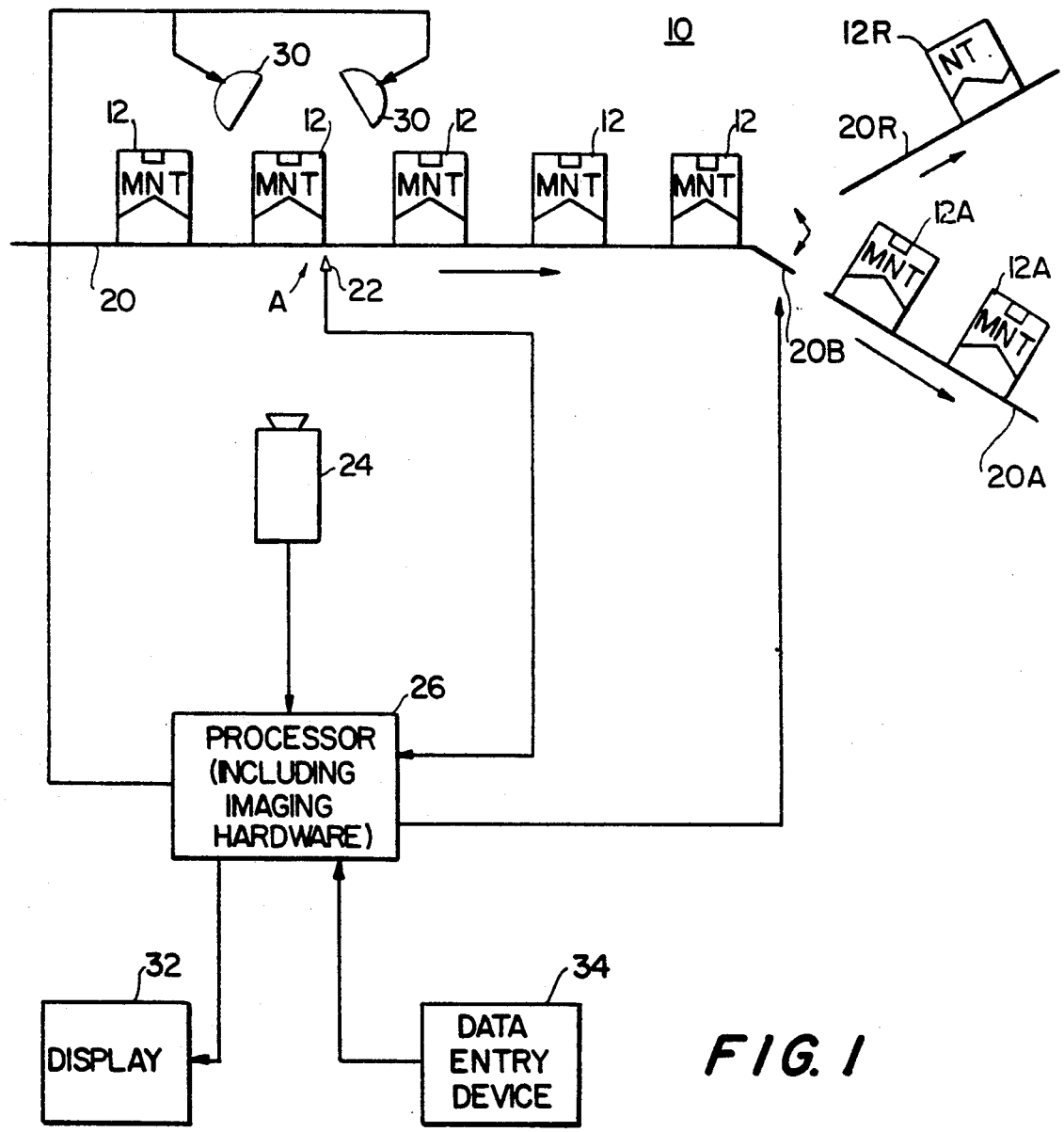
FIG. 1 is a simplified block diagram of an illustrative product inspection system which can be operated in accordance with, this invention.

An illustrative product inspection system 10 which can incorporate the present invention is shown in FIG. 1. Products 12 (e.g., cigarette packs) to be inspected are conveyed one after another from left to right as viewed in FIG. 1 by conveyor 20. Each time a product is properly positioned (at A) in front of camera 24 (as detected by detector 22), processor 26 (which includes conventional imaging hardware) "grabs" the image of the product from camera 24. Processor 26 may cause lights 30 to briefly illuminate the product at location A to help sharpen the image received by the processor. Processor 26 analyzes each image in accordance with this invention as described in more detail below so that by the time the associated product 12 reaches the controllable branch 20B in conveyor 20, processor 26 has determined whether or not the product has an acceptable appearance. If the product's appearance is acceptable, processor 26 controls conveyor branch 20B so that the product is directed to conveyor 20A which conveys accepted products 12A away for further processing appropriate to such products. On the other hand, if the product's appearance is unacceptable, processor 26 controls conveyor branch 20B so that the product is directed to conveyor 20R which conveys unacceptable and therefore rejected products 12R away for further processing appropriate to such products.

Processor 26 is augmented by a display 32 (e.g., a conventional video display) and a data entry device 34 (e.g., a conventional keyboard, mouse, and/or touch screen elements associated with display 32). Display 32 may display such information as the product images received from camera 24 and/or messages as to the status of the system, the types of image defects being detected, etc. Data entry device 34 may be used to control operation of the system, to enter various operating parameters, etc.

While FIG. 1 suggests that system 10 operates on a single elevational image of products 12, it will be apparent to those skilled in the art that the system could be set up to test multiple images of products 12 taken from different angles and including perspective views so that as many surfaces are inspected as are desired. Similarly, although the system will be explained in terms of monochrome (e.g., black and white) images, it will be apparent to those skilled in the art how the system can be modified to inspect in full color. Thus camera 24 can be a conventional NTSC or RGB compatible camera. Processor 26 may be a suitably programmed conventional 386 personal computer workstation such a CAT386 workstation available from Comark Corp. of Medfield, Mass., with a conventional IM-1280 imaging hardware system available from Matrox Electronic Systems Limited of Dorval, Quebec, Canada.

Figure 2A:
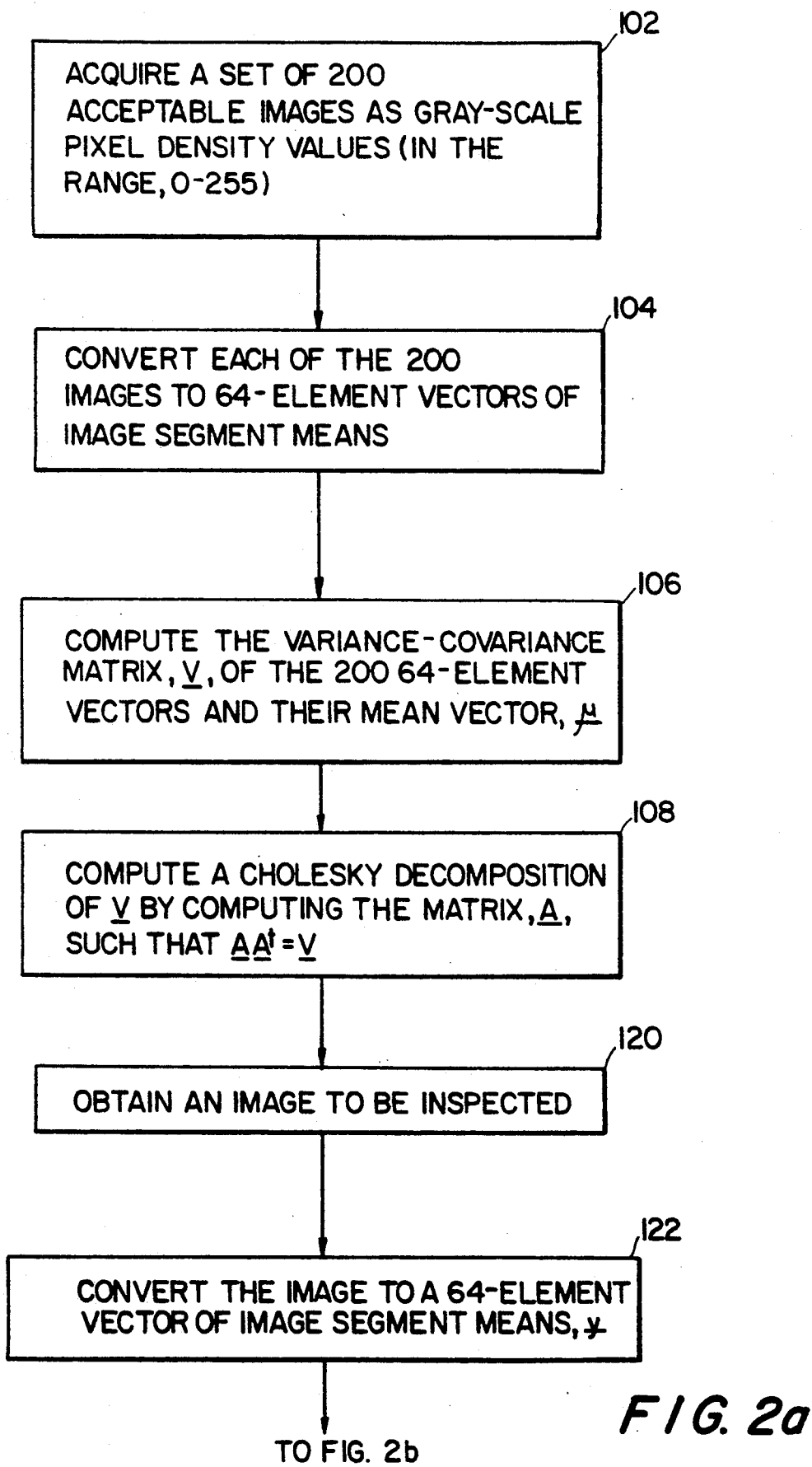

An illustrative embodiment of the methods of this invention is shown in FIG. 2. When this method is performed by apparatus of the type shown in FIG. 1, processor 26 is programmed to perform the steps shown in FIG. 2.

The first phase of product or other image inspection in accordance with this invention is to gather statistical information about the images to be inspected. This can be done in other ways if desired, but FIG. 2 assumes that the necessary statistical information is derived from a predetermined number of actual product images which are known to be acceptable. Accordingly, in step 102 processor 26 acquires a predetermined number (e.g., 200) of acceptable images (e.g., by passing 200 products 12 of known acceptability through system 10). Processor 26 digitizes each of these images in the conventional way (e.g., by assigning to each pixel a gray scale digital value in the range from 0 through 255 based on the intensity of the corresponding region in the original image). Although the images may have any other size, aspect ratio, or total number of pixels, in the depicted preferred embodiment each image is 256 by 232 pixels In step 104 processor 26 breaks each of the 200 sample images from step 102 down into 64 segments. Although the number, size, and arrangement of these segments could be different if desired, in the preferred embodiment an 8 by 8 arrangement of equally sized segments is used. Also in step 104 the pixel values in each segment of each sample image are combined (e.g., averaged) to produce a single value for each segment. The resulting 64 values for each sample image form a 64-element vector representative of that image.

In step 106 processor 26 computes a variance-covariance matrix V of the 200 64-element vectors from step 104. It is assumed that these vectors have a multivariate normal (i.e., Gaussian) distribution across the 200 sample images. FIG. 3 shows what is meant by a variance-covariance matrix of two-element vectors, but of course in the case of the 64-element vectors actually used in the preferred embodiment V is a 64 by 64 matrix. In such matrices (as in FIG. 3) $\sigma_i$ is the standard deviation of the 200 values for the ith segment from step 104, and $\rho_{ij}$ is the correlation coefficient between the values from step 104 for the ith and jth segments. Also in step 106 processor 26 computes a 64-element mean vector which is just the segment-by-segment average of the 200 vectors from step 104.

In step 108 a lower triangular matrix A is computed such that A times its transpose equals V. FIG. 4 illustrates what is meant by a lower triangular matrix in the case of two-by-two matrices. FIG. 5 shows the transpose of the matrix shown in FIG. 4. Again, of course, in the preferred embodiment A is a 64-by-64 element matrix. The construction of A is known as the Cholesky decomposition of the matrix V. The matrix A is useful because of the transform shown in FIG. 6. In FIG. 6 $A^{-1}$ is the inverse of A, y is a 64-element vector similar to any of the vectors discussed above in connection with step 104 but for an image being actually inspected, and $\mu$ is the mean vector from step 106. If y is transformed to z as shown in FIG. 6, then z has a standard multivariate normal density function with mean vector 0 and a variance-covariance matrix which is the identity matrix (i.e., a matrix in which the diagonal elements are 1 and all other elements are 0). Because z has a standard multivariate normal distribution, the sum of its squared elements, z·z, has a central chi-square distribution with degrees of freedom equal to the number of segments per image. An exemplary table of the cumulative distribution of central chi-square is Table A5 in *Statistical Methods*, Snedecor, G.W. and Cochran, W.G., Iowa State University Press, Ames, Iowa, 1967. As discussed in more detail below, there are also well-known formulas and computer programs for computing the cumulative distribution of central chi-square. The image vector y, if it is a random sample from the set of sample images, cannot be assumed to be drawn from a distribution with mean 0 and variance-covariance matrix I (the identity matrix). Consequently, the sum of squared elements, y·y, cannot be assumed to be chi-square distributed, and, in fact, its distribution will be unknown. Standardization using $A^{-1}(y-\mu)$ is essential because absent such standardization, computation of a simple inspection index is impossible. Accordingly, standardization of the statistical information as described above greatly simplifies the image inspection process in accordance with this invention.

At the conclusion of step 108 the system is ready to begin actual image inspection. Accordingly, in step 120 an image to be inspected is obtained (e.g., by operating elements 24, 26, and 30 in FIG. 1 to obtain the image of the product 12 which is currently in the field of view of camera 24). The data for this image is similar to the image data described above in connection with step 102.

In step 122 the image data from step 120 is converted to a vector y in the same way that each of the sample images considered in step 104 is converted to such a vector. In particular, the image is segmented into the same 64 segments used in step 104, and the pixel values in each segment are combined to produce a single "mean" value for that segment. These 64 mean values are the elements of vector y.

In step 124 the transformation discussed above in connection FIG. 6 is performed on vector y to produce vector z. As described above, this transformation standardizes the vector for the inspected image in order to compare it to the known standardized distribution of sample images.

In step 126 the dot product of the vector z with itself is computed.

In step 128 a value c is selected by choosing a number $\alpha$ (the probability that an acceptable image will be falsely rejected) and then finding the associated value of chi-square corresponding to $\alpha$ with 64 degrees of freedom. This can be done by looking up the appropriate value of chi-square in a published table of the cumulative distribution of chi-square if $\alpha$ is greater than about 0.005 (which is typically the limit of published tables). Alternatively, the appropriate value of chi-square can be computed using well-known formulas available on conventional calculators and digital computers. One such formula is embodied in a computer program known as CHIIN which is part of the well-known International Mathematical and Statistical Library ("IMSL"). This program allows the user to enter the desired probability a and the number of degrees of freedom, and provides c as an output. For example, if $\alpha$ is selected top be $10^{-7}$ (with 64 degrees of freedom), c is found to be approximately 141.

In step 130 the dot product computed in step 126 is compared to the value c determined in step 128. If the dot product is greater than c, the associated product 12 is rejected as having an unacceptable image. If the dot product is less than or equal to c, the associated product 12 is accepted as having an acceptable image.

Step 140 is optional and is employed only if it is desired to periodically refine the statistical base against which subsequent product images are tested. If the periodic refinement is desired, then in step 140 the vectors y of selected images which have been determined in step 130 to be acceptable are saved. After such vectors have been accumulated, steps 106 and 108 are performed again on the now-extended acceptable image data base in order to compute new values of V, $\mu$, and A. Thereafter, these new values are used in step 124.

Step 150 is also optional and is performed if it is desired to have the system provide information as to why it rejected an image in step 130. If included, step 150 is performed when an image has been rejected. The elements which are summed to compute the dot product in step 126 are ordered in order to find the largest of these dot product elements. Then the elements of y making the largest contribution to the largest dot product element (through the equation shown in step 124) are identified. The image segment or segments associated with these elements of y are identified to the operator of the system (e.g., by an appropriate message on display 32). This tells the operator which image segment or segments are defective or most defective. This in turn may help the operator correct the problem which is causing products 12 to have an unacceptable appearance.

Step 160 merely makes it clear that steps 120 through 150 are repeated for each new product image.

It will be understood that the foregoing is merely illustrative of the principles of this invention and that various modifications can be made by those skilled in the art without departing from the scope and spirit of the invention. For example, although steps 102–108 refer to the use of an initial sample of 200 acceptable images, a smaller or larger initial sample can be used if desired.

What is claimed is:

1. The method of determining whether a test image is substantially like any of a plurality of sample images comprising the steps of:
    using said computer processor means to subdivide each of said sample images into a plurality of segments;
    using said computer processor means to associate with each segment of each sample image a value representative of the image information in the segment to produce a vector of said values for each sample image, each vector having a number of elements equal to the number of segments in each sample image;
    using said computer processor means to calculate a variance-covariance matrix of said vectors;
    using said computer processor means to calulate a mean vector of said vectors;
    using said computer processor means to calculate a Cholesky decomposition matrix of said variance-covariance matrix such that said Cholesky decomposition matrix times the transpose of said Cholesky decomposition matrix equals said variance-covariance matrix;
    using a camera to capture a test signal representative of said test image;
    using computer processor means to form said test image from of said test signal;
    using said computer processor means to convert said test image into gray-scale pixel density values;
    using said computer processor means to subdivide said test image into a plurality of segments similar to the segments used for said sample images;
    using said computer processor means to associate with each segment of said test image a value representative of the image information in that segment to produce an image vector of said values, said image vector having a number of elements equal to the number of segments in said test image;
    using said computer processor means to calculate a product vector equal to the product of the inverse of said Cholesky decomposition matrix times the difference between said image vector and said means vector;
    using computer processor means to calculate the dot product of said product vector with itself;
    using computer processor means to compare said dot product to a predetermined value; and
    using said computer processor means to identify said test image as substantially like a random sample of said sample images only if said dot product has a predetermined relationship to said predetermined value.

2. The method defined in claim 1 wherein said predetermined value is selected from a table of the cumulative distribution of central chi-square.

3. The method defined in claim 1 further comprising the step of using said computer processor means to recalculate the variance-covariance matrix, the means vector, and the Cholesky decomposition matrix with said test image added to the plurality of sample images.

4. The method defined in claim 1 further comprising performing the following step if the last step of claim 1 does not result in identification of said test image as substantially like a random sample of said sample images:
    using said computer processor means to identify the segment of said test image making the largest contribution to said dot product.

5. The method defined in claim 4 wherein said step of using said computer processor means to identify the segment of said test image making the largest contribution to said dot product comprises the steps of:

using said computer processor means to identify the largest of the dot product elements which are summed to produce said dot product; and using said computer processor means to identify the segment of said test image making the largest contribution to said largest of said dot product elements.

6. Apparatus for determining whether a test image is substantially like any of a plurality of sample images comprising:

computer processor means for similarly subdividing each of said sample images into a plurality of segments;

computer processor means for associating with each segment of each sample image a value representative of the image information in that segment to produce a vector of said values for each sample image, each vector having a number of elements equal to the number of segments in each sample image;

computer processor means for computing a variance-covariance matrix of said vectors;

computer processor means for computing a mean vector of said vectors;

computer processor means for computing a Cholesky decomposition matrix of said variance-covariance matrix such that said Cholesky decomposition matrix times the transpose of said Cholesky decomposition matrix equals said variance-covariance matrix;

camera means for capturing a test signal representative of said test image;

computer processor means for forming said test image from said test signal;

computer processor means for converting said test image into gray-scale pixel density values;

computer processor means for subdividing said test image into a plurality of segments similar to the segments used for said sample images;

computer processor means for associating with each segment of said test image a value representative of the image information in that segment to produce an image vector of said values, said image vector having a number of elements equal to the number of segments in said test image;

computer processor means for computing a product vector equal to the product of the inverse of said Cholesky decomposition matrix times the difference between said image vector and said mean vector;

computer processor means for computing the dot product of said product vector with itself;

computer processor means for comparing said dot product to a predetermined value; and computer processor means for identifying said test image as substantially like a random sample of said sample images only if said dot product has a predetermined relationship to said predetermined value.

7. The apparatus defined in claim 6 wherein said predetermined value is selected from a table of the cumulative distribution of central chi-square.

8. The apparatus defined in claim 6 further comprising computer processor means for recomputing the variance-covariance matrix, the mean vector, and the Cholesky decomposition matrix with said test image added to the plurality of sample images.

9. The apparatus defined in claim 6 further comprising computer processor means for identifying the segment of said test image making the largest contribution to said dot product if the last element of claim 6 does not identify said test image as substantially like a random sample of said sample images.

10. The apparatus defined in claim 9 wherein said computer processor means for identifying the segment of said test image making the largest contribution to said dot product comprises:

computer processor means for identifying the largest of the dot product elements which are summed to produce said dot product; and computer processor means for identifying the segment of said test image making the largest contribution to said largest of said dot product elements.

11. The apparatus defined in claim 6 wherein said test image is representative of a test subject.

12. The apparatus defined in claim 11 further comprising means for conveying said test subject along a path.

13. The apparatus defined in claim 12 wherein said camera means is operative at a position along said path.

14. The apparatus defined in claim 13 wherein said computer processor means operatively communicates with said camera.

* * * * *